B. COCK.
FRONT COVER FOR ROCK DRILLS.
APPLICATION FILED APR. 9, 1912.
1,035,083.
Patented Aug. 6, 1912.
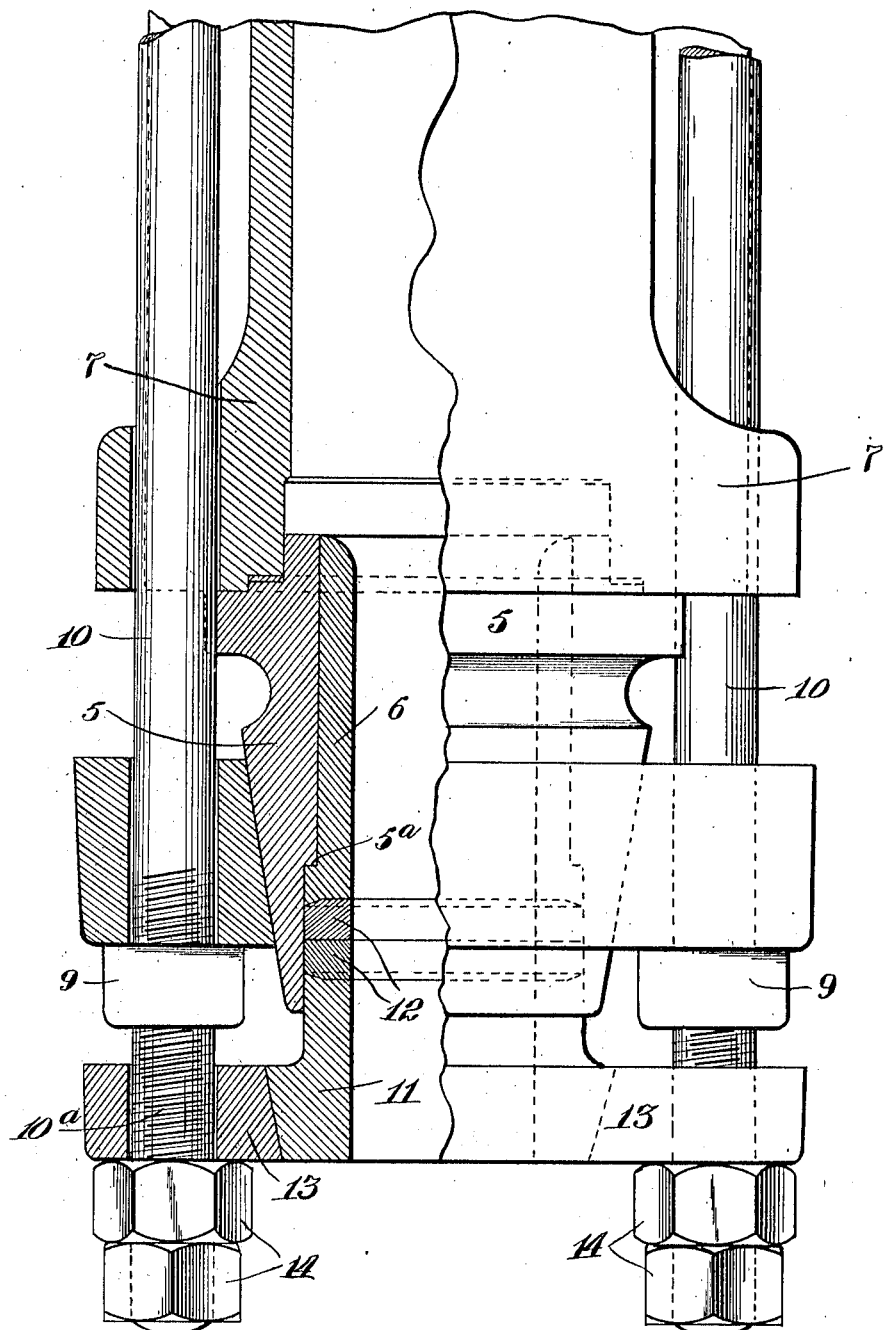

UNITED STATES PATENT OFFICE.

BENJAMIN COCK, OF CAMBORNE, ENGLAND, ASSIGNOR TO HOLMAN BROTHERS, LIMITED, OF CAMBORNE, ENGLAND, A CORPORATION OF GREAT BRITAIN.

FRONT COVER FOR ROCK-DRILLS.

1,035,083. Specification of Letters Patent. Patented Aug. 6, 1912.

Application filed April 9, 1912. Serial No. 689,660.

*To all whom it may concern:*

Be it known that I, BENJAMIN COCK, a subject of the King of Great Britain, residing at Camborne, in the county of Cornwall, England, have invented new and useful Improvements in Front Covers for Rock-Drills, of which the following is a specification.

My present invention relates to the front cover or head of rock drills in which the parts constituting the head have to be fitted upon a piston-rod having ends larger in size than the diameter of the rod.

The object of the invention is to provide a front cover for apparatus of the character described which is simple and durable in construction, which is easily assembled, and in which the parts subjected to wear can be easily and cheaply replaced.

With this object in view the invention consists of certain novel features of construction, arrangement, and combination of parts as hereinafter described and more particularly pointed out in the claims.

As illustrated in the accompanying drawing, in the single figure of which is shown partly in plan and partly in section a front cover embodying my invention, I make use of a split front head 5, with split bushing 6, of the ordinary type which is secured within the front end of the cylinder 7 in the usual way by means of a gland 8 forced back over the tapered outer end of the head by nuts 9 upon the threaded ends of two side bolts 10. The split bushing, which lines the head and forms a bearing for the piston-rod, has heretofore been held in place by fitting the flange 6ª at its outer end into an annular groove or channel provided for the purpose around the inner wall of the head; but, as here shown, I enlarge the bore of the head at its outer end to admit the flanged end of the bushing, forming an annular shoulder 5ª which is adapted to engage the flange on the bushing and so fix the limit of its inward movement. And, in addition to this, I provide the head with a stuffing-box comprising the split bushing 11 which fits into the enlarged outer bore of the head, forming an extension of the bearing of the piston-rod, and is forced back against the packing 12, interposed between its inner end and outer end of the bushing 6, and held in place by the gland 13 which in turn is forced back over the tapering outer surface of the flanged end of the bushing and held by lock- nuts 14 upon the threaded extensions 10ª of the two side bolts. By this construction I provide not only a more extended bearing for the piston-rod but also a tight packing which will prevent leakage. Furthermore, both the outer and inner bushings and the packing, of which any standard type may be used, can be quickly and easily removed and replaced without disturbing the front head; whereas, as heretofore constructed, the bushing could only be removed by taking off and separating the two halves of the head.

While I have shown and described the invention in what I now consider to be the best form for its embodiment, it will be understood that it may be variously modified in its details, within the scope of the appended claims, without departing from the spirit or sacrificing the advantages thereof.

What I claim as new, and desire to secure by Letters Patent, is—

1. In a front cover for rock-drills, the combination, with a split front head, a gland, and side bolts and nuts, of an inner split bushing adapted to be inserted into the head from its outer end and provided with a stop to limit its inward movement, an annular packing adapted to be inserted into the head against the outer end of the bushing, an outer split bushing adapted to be inserted into the outer end of the head to bear against the packing, and means, including a gland and extension of the side bolts, for forcing the outer bushing back against the packing and holding it in place.

2. A front cover for a rock-drill comprising a split head having its bore enlarged at the outer end and an annular shoulder around its inner wall, a gland for the head, a split bushing fitting within the smaller bore of the head and having an annular flange at its outer end adapted to engage the shoulder within the head, an annular packing within the larger bore of the head at the flanged end of the bushing, a second split bushing fitting the larger bore at the outer end of the head and extending outwardly therefrom, a gland for the second bushing, two side bolts passing through the two glands, and nuts upon the threaded ends of the side bolts for forcing the glands back upon the head and the second bushing respectively.

3. A stuffing-box for the cylinder of a rock-drill comprising a split bushing the inner end of which is adapted to fit into the outer end of the front head of the cylinder and bear against a packing at the outer end of the bushing within the head and the outer end of which is flanged and has a tapered outer surface, a gland adapted to fit upon the tapered surface of the bushing, and two bolts on opposite sides of the cylinder adapted to extend through holes in the gland and provided with nuts upon their threaded outer ends.

BENJAMIN COCK.

Witnesses:
W. J. ROBBINS,
F. K. BAKER.

Copies of this patent may be obtained for five cents each, by addressing the "Commissioner of Patents. Washington, D. C."